ELECTRONIC DRIVER FOR TRANSVERSE MODE POCKEL CELL

Filed July 31, 1967

RALPH H. HINZE

INVENTOR.

BY William E. Johnson, Jr.

ATTORNEY

United States Patent Office 3,539,835
Patented Nov. 10, 1970

3,539,835

ELECTRONIC DRIVER FOR TRANSVERSE MODE POCKEL CELL

Ralph H. Hinze, Houston, Tex., assignor to Dresser Systems, Inc., Dallas, Tex., a corporation of Delaware Filed July 31, 1967, Ser. No. 657,234
Int. Cl. H03k *5/00*
U.S. Cl. 307—268 3 Claims

ABSTRACT OF THE DISCLOSURE

An emitter follower pre-amp stage is coupled into a common base output stage, the output of which is coupled through a pair of complementary emitter follower stages. The circuit transforms low voltage pulses into pulses of varying amplitudes up to approximately 220 volts having widths of 500 nanoseconds and repetition rates varying from D.C. to 30 megacycles even into capacitive loads.

BACKGROUND OF THE INVENTION

The invention relates generally to a circuit for producing high voltage pulses and particularly to an electronic circuit for driving a light modulator.

In the art of light modulation, for example, in laser beam data plotting, it is sometimes necessary to provide high voltage, high frequency, "spike" pulses into capacitive loads. In the co-pending U.S. application Ser. No. 577,259, filed Sept. 6, 1966 now United States Patent No. 3,389,-403, and assigned to the assignee of the present invention, there is described such a system wherein a Pockel cell modulator is driven by logic circuitry to either block the laser beam or to provide varying shades of gray. Pockel cells and similar type light modulators are capacitive loads and therefore difficult to drive with high voltage, high frequency pulses.

It is therefore the primary object of this invention to provide an improved circuit which produces high voltage, high frequency pulses;

It is a further object of the invention to provide a circuit whose high voltage, high frequency output pulses have fast rise and fall times; and It is still another object of the invention to provide a circuit which produces high voltage, high frequency pulses even into a capacitive load.

The objects of the invention are accomplished, broadly, by a circuit having an emitter follower pre-amp stage drive a common base output stage, the output of which is coupled into at least one complementary emitter follower stage. The output of the complementary emitter follower stage thus provides high voltage, high frequency pulses having fast rise and fall times even into capacitive loads.

Figure 1:
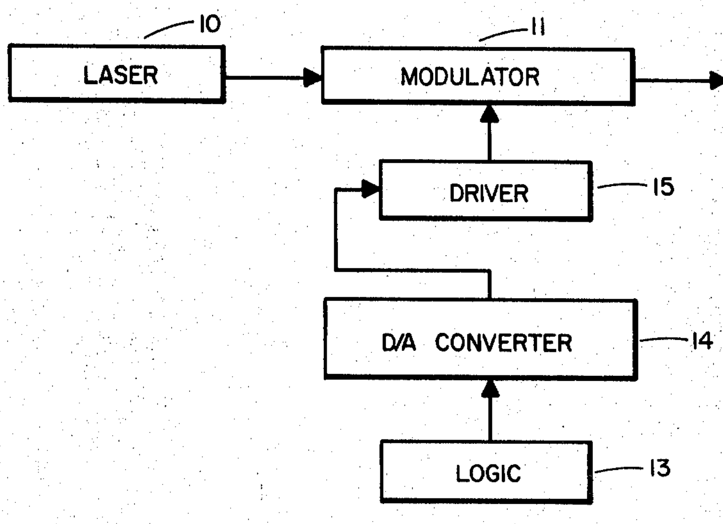
Figure 2:
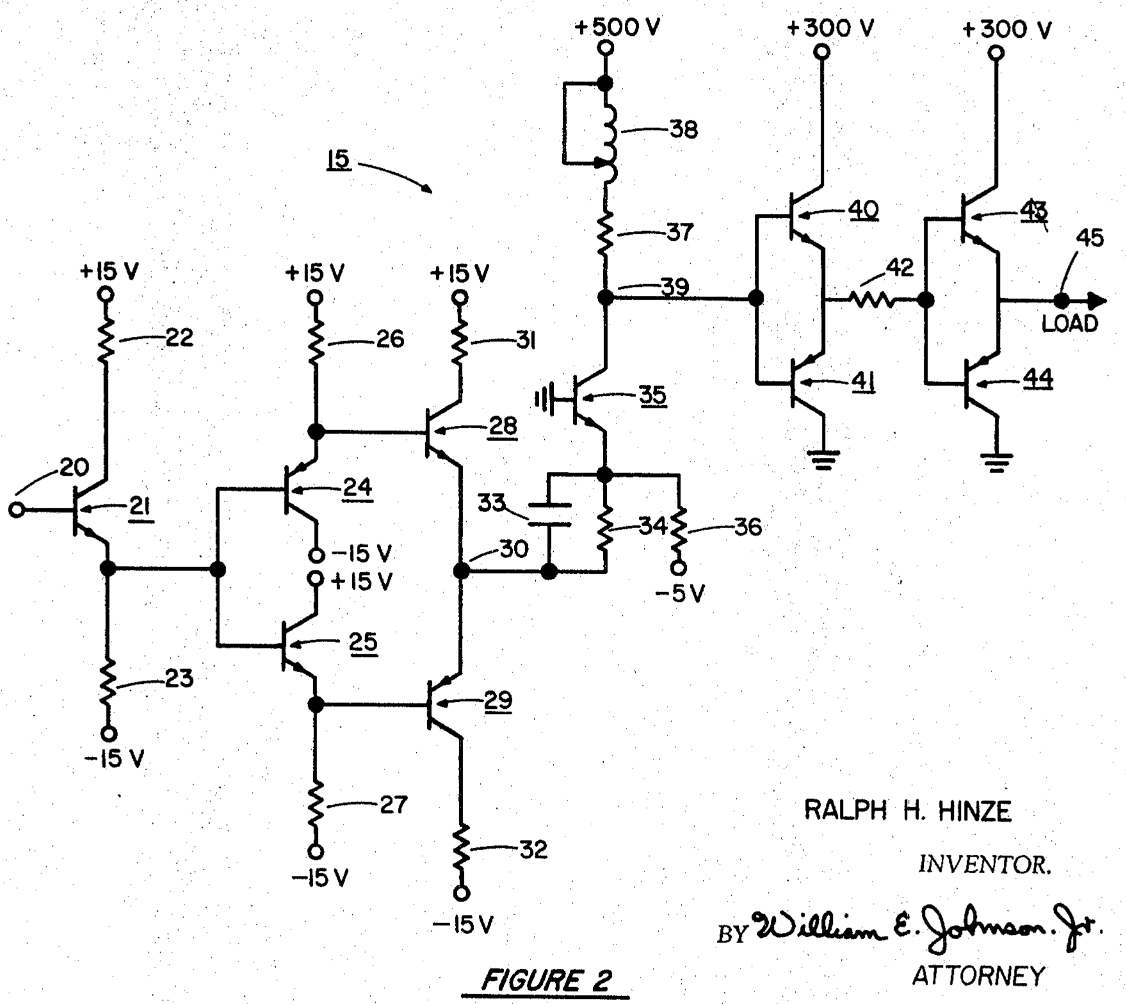

These and other objects, features and advantages of the present invention will become apparent upon reading the following specification and referring to the accompanying drawing, in which:

FIG. 1 is a block diagram of a portion of a laser data plotter in which the driver circuit according to the invention is employed; and FIG. 2 is a schematic diagram of the circuit according to the preferred embodiment of the invention.

Referring now in detail to FIG. 1 of the drawing, there is illustrated in block diagram a portion of a laser data plotter similar to that described in said co-pending application. A laser apparatus 10 transmits a beam of coherent light through the Pockel cell modulator unit 11, the output of which is coupled into the lens 12. Logic circuitry 13, for example, from a digital computer (not illustrated) is coupled through a D/A converter stage 14 to the driver circuit 15, the driver circuit being more fully described with respect to FIG. 2.

In FIG. 2 there is illustrated a schematic diagram of the driver circuit according to the present invention. The input terminal 20, to which low voltage pulses are applied, for example, from the D/A converter stage 14 of FIG. 1, is connected to the base of transistor 21, the collector being coupled through resistor 22 to +15 volts and the emitter being coupled through resistor 23 to −15 volts. The emitter of transistor 21 is connected to drive the base of each of transistors 24 and 25. The emitter of transistor 24 is coupled through resistor 26 to +15 volts, the collector being connected to −15 volts. The emitter of transistor 25 is coupled through resistor 27 to −15 volts, the collector being connected to +15 volts. The emitters of transistors 24 and 25 are respectively connected to the bases of transistors 28 and 29, the emitters of transistors 28 and 29 being joined together at junction 30. The collector of transistor 28 is coupled through resistor 31 to +15 volts, while the collector of transistor 29 is coupled through resistor 32 to −15 volts.

In the operation of the circuitry between junctions 20 and 30, it should be appreciated that the emitter followers therebetween together produce a low output impedance for the signal at junction 30, whereas the input signal appearing at junction 20 is normally from a high impedance point. It should furthermore be appreciated that the signal appearing at junction 30 has approximately the same amplitude as that of the input signal at junction 20 due to the amplification characteristics of emitter followers.

Junction 30 is connected through the parallel connection of capacitor 33 and resistor 34 to the emitter of transistor 35, the emitter also being connected through resistor 36 to −5 volts. The collector of transistor 35 is coupled through resistor 37 and the variable inductor coil 38 to +500 volts. The value of resistor 36 is chosen to cause about 280 volts to be dropped across the resistor 37 and coil 38 with no input signal from junction 30, thus causing the collector of transistor 35 to be at approximately +220 volts in a no input condition. The coil 38 is variable to affect the rise and fall times of the output pulses from the collector of transistor 35. It should be appreciated that resistor 34 determines the current through transistor 35, whereas the capacitor 33 causes the input pulses from junction 30 to be more squarely shaped.

Thus, the output from junction 39 (connected to the collector of transistor 35) is seen to vary from approximately 20 to 220 volts as transistor 35 is turned off and on by the pulses from junction 30, the 20 volts being due to the collector-base voltage in the common base configuration when transistor 35 is conducting.

The junction 39 is connected to the bases of transistors 40 and 41, the emitters of which are connected together and are coupled through the current limiting resistor 42 to the bases of transistors 43 and 44. The collectors of transistors 40 and 43 are each connected to +300 volts, whereas the collectors of transistors 41 and 44 are both grounded. The emitters of transistors 43 and 44 are connected to the output terminal 45, from which the high voltage, high frequency pulses according to the invention can be presented to a load, for example, a Pockel cell modulator having a capacitive load.

It should be appreciated that transistors 40 and 43 primarily determine the rise times of the output pulses, whereas transistors 41 and 44 primarily determine the fall times, although these are also affected by the inductive coil 38 as discussed above.

An important feature of the invention is the 500 volt supply connected through the inductor 38 and resistor 37 to junction 39, especially when the output 45 is connected to a capacitive load. This should be appreciated from a realization that a capacitor charges to 200 volts from a 500 volt source much faster than from a 200 volt source, for example.

Thus there has been described and illustrated a circuit for providing high voltage, high frequency pulses, but which will also provide low frequency, low voltage pulses at its output as dictated by the input pulses.

Such a circuit has been fabricated and tested, the results being the provision of output pulses ranging from 20 to 220 volts, repetition rates from D.C. to 30 megacycles and having pulse widths of approximately 500 nanoseconds when coupled into a capacitive load such as a Pockel cell.

Even though the particular Pockel cell used in the testing of this circuit requires 210 volts for full modulation and has an input impedance of 130 picofarads, it should be appreciated that the circuit according to the invention can be modified by those skilled in the art to accommodate different voltages and input impedances.

Although the preferred embodiment of the driver circuit according to the invention finds utility in driving capacitive loads, it should be appreciated that such a circuit also finds utility in driving other types of loads, for example, resistive loads.

While the present invention has been desribed in some detail by way of example and for illustrating the preferred embodiment of the invention, it is understood that certain changes and modifications may be practiced within the spirit of the invention and that the invention is to be limited only by the scope of the appended claims.

The embodiments of the invention in which an exclusive property or privilege is claimed are defined as follows:

1. An electronic circuit for driving a light modulator with high voltage pulses comprising:

(a) an input terminal;

(b) a first impedance-matching, pre-amplifier stage connected to said input terminal;

(c) an output stage having a supply voltage of a given amplitude connected to said pre-amplifier stage, (d) said output stage comprising a common-base transistor configuration having an output-determinative inductive load connected between the collector of said transistor and said supply voltage of a given amplitude whereby the output pulses from said output stage have a maximum voltage amplitude substantially lower than said given amplitude; and (e) pulse-shaping means connected to said output stage.

2. The circuit according to claim 1 wherein said preamplifier stage comprises a first emitter follower transistor stage, a first pair of emitter follower stages driven by said first emitter follower stage, and a second pair of emitter follower stages driven by said first pair of emitter follower stages.

3. The circuit according to claim 1 wherein said pulse-shaping means comprises at least one complementary emitter follower stage.

References Cited

UNITED STATES PATENTS 3,418,589 12/1968 Yee ---------------- 330—13

OTHER REFERENCES

I.B.M. Technical Disclosure Bulletin Lamoureux, vol. 6, No. 4, September 1963, p. 112.

JOHN S. HEYMAN, Primary Examiner

B. P. DAVIS, Assistant Examiner

U.S. Cl. X.R.

307—264; 330—20